Aug. 8, 1950     J. D. PEARSON ET AL     2,517,918
APPARATUS FOR DROWNING NITROCELLULOSE
Original Filed July 23, 1943     4 Sheets-Sheet 1
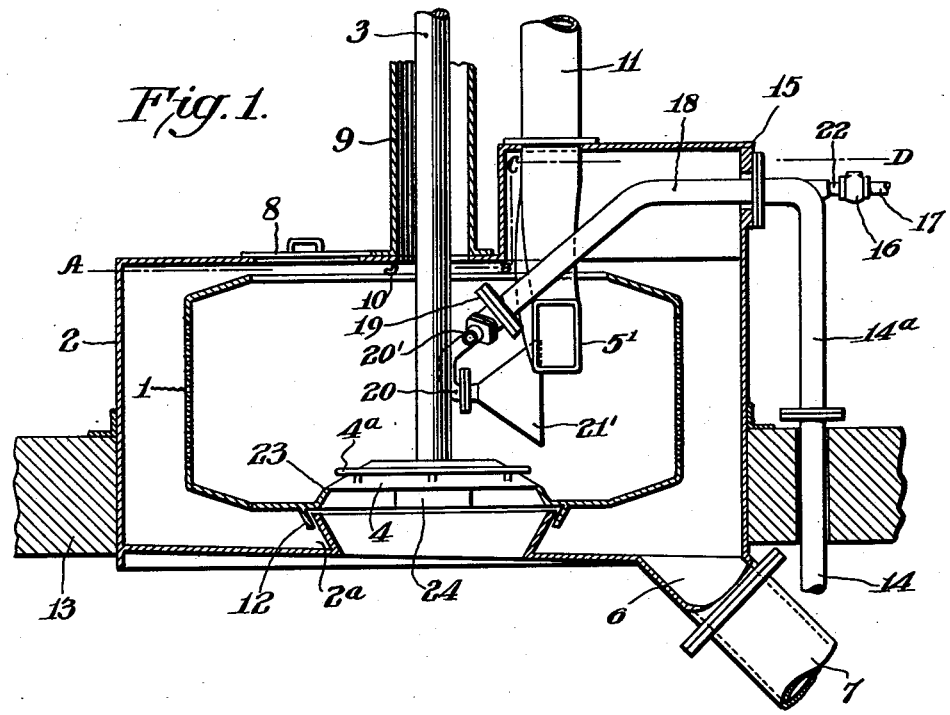
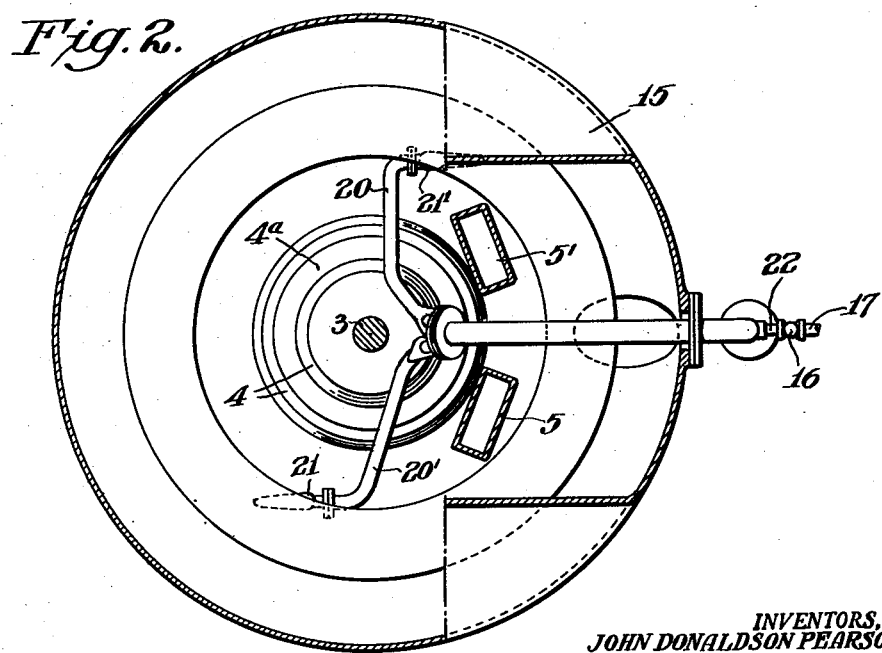
INVENTORS,
JOHN DONALDSON PEARSON
& DONALD GEORGE ASHCROFT
BY
*Thos. A. Wilson*
ATTORNEY

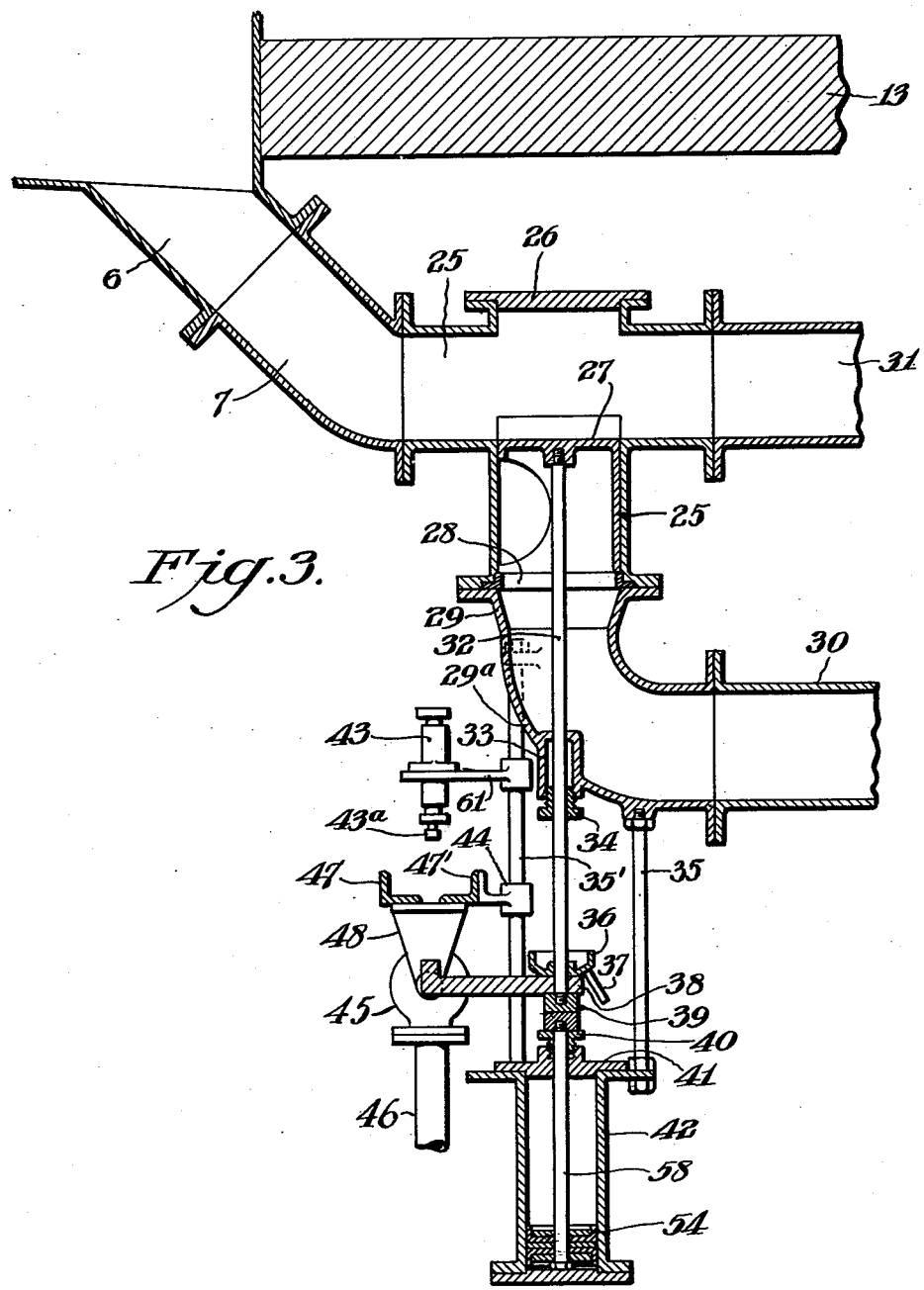

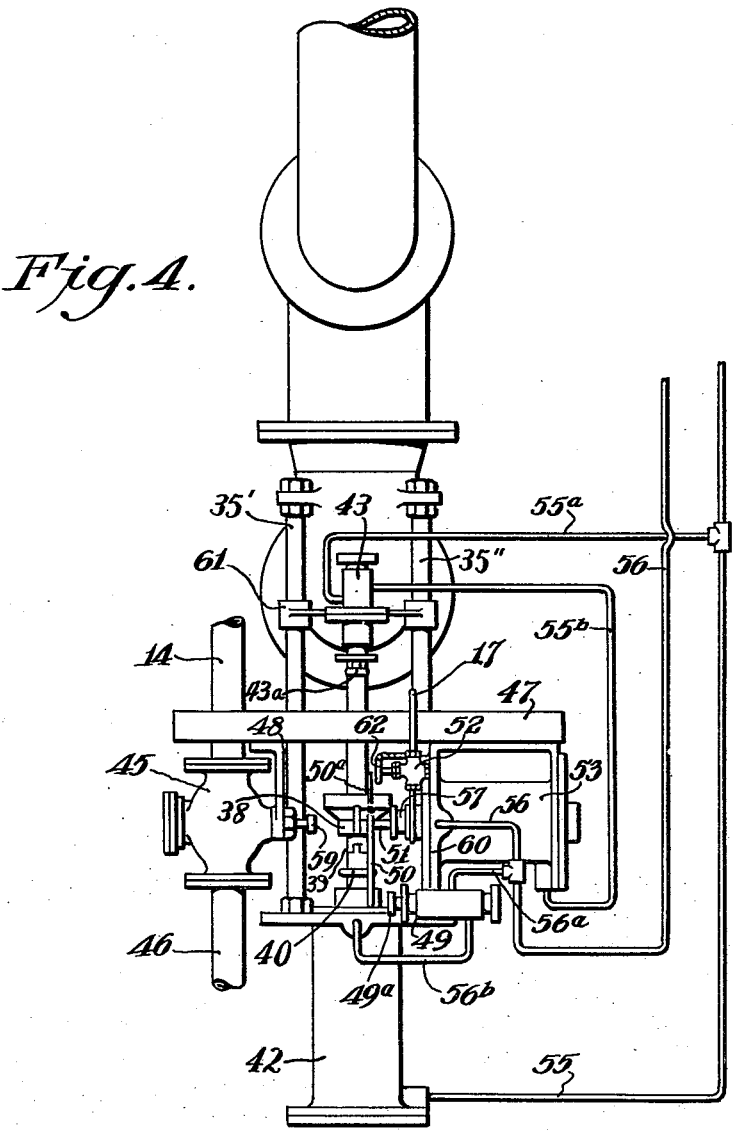

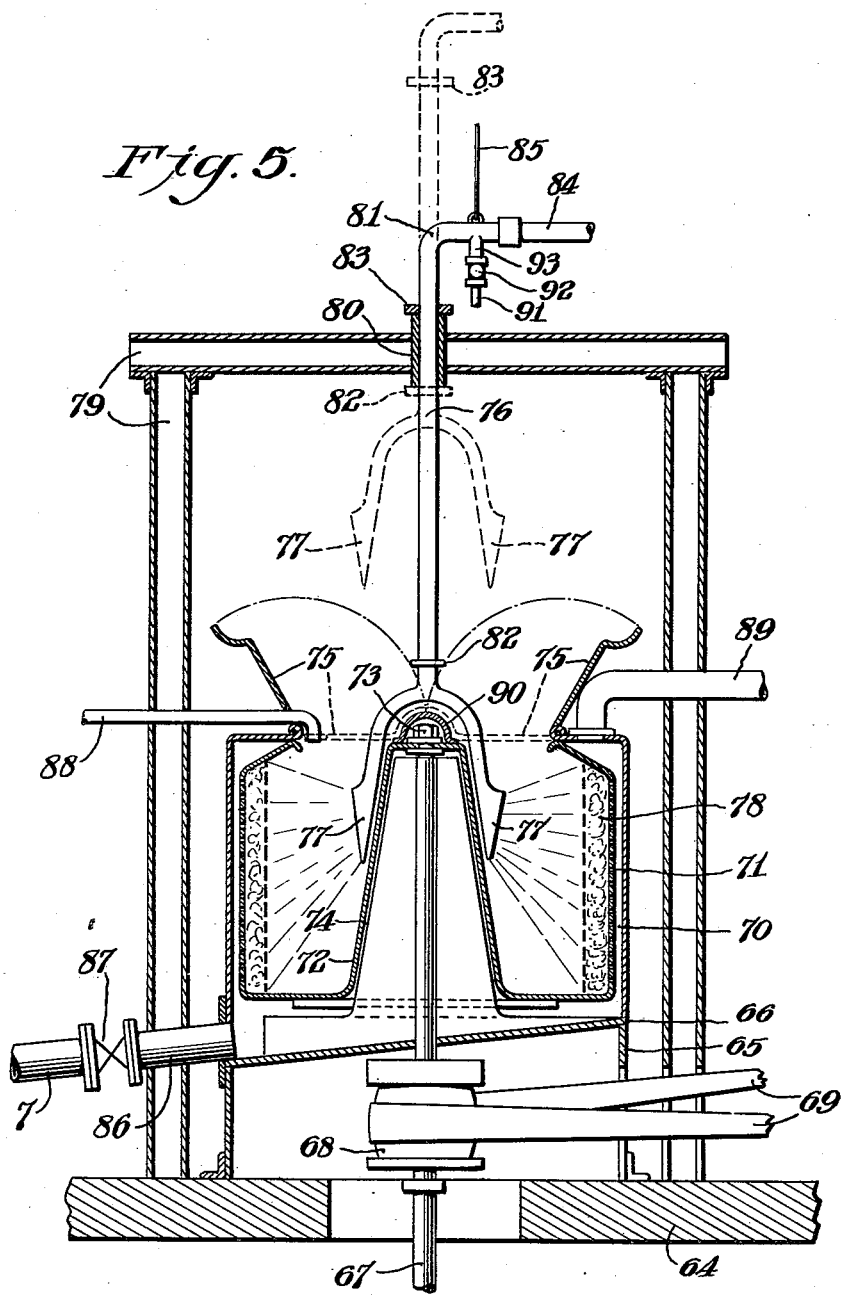

Patented Aug. 8, 1950

2,517,918

UNITED STATES PATENT OFFICE 2,517,918

APPARATUS FOR DROWNING NITROCELLULOSE

John Donaldson Pearson and Donald George Ashcroft, Saltcoats, Scotland, assignors to Imperial Chemical Industries Limited, a corporation of Great Britain Original application July 23, 1943, Serial No. 495,884. Divided and this application October 11, 1945, Serial No. 621,680. In Great Britain December 8, 1941

5 Claims. (Cl. 210—67)

This invention relates to the manufacture of nitrocellulose by processes in which the separation of the waste nitration acid from the nitrocellulose is effected centrifugally, and relates more particularly to processes for the centrifugal separation of the waste acid in which special provision is made for the drowning of the centrifuged nitrocellulose. The invention is applicable to the separation of waste nitration acid from the nitrocellulose independently of the process by which nitration has been effected, and may be applied, for example, where the nitration has been effected by the so-called mechanical and pot processes, and also where the nitration has itself been conducted in a centrifuge.

This is a divisional application of application Serial No. 495,884, filed July 23, 1943, which has become abandoned.

In processes of the aforementioned description it is frequently the custom to separate the nitrocellulose from the waste acid in a centrifugal whereof the casing is provided with an outlet for the waste acid at its periphery and a basal outlet in the region of its axis leading to a drowning funnel, and the basket is provided with a similarly situated basal outlet closed by a removable cover. After the greater part of the waste acid has been removed by the rotation of the centrifugal basket, the rotation is discontinued and the cover is removed by the operator, who then breaks up the resulting annular cake of nitrocellulose moist with waste acid and drops it in portions into a funnel in which it is drowned in a large volume of cold water that has been caused to stream rapidly into the upper part of this funnel. The waste acid associated with the centrifuged nitrocellulose is thereby rapidly brought to a highly diluted state, and the drowned nitrocellulose falling from the funnel, if desired after further purification, is thereafter stabilised. The undiluted waste acid that flows from the casing of the centrifugal is collected in a receptacle which is commonly made of mild steel, and is afterwards refortified.

The nitration of cellulose is a reversible reaction, and denitration proceeds with greatest velocity when the nitrocellulose is left in contact with an acid that is more dilute than the original waste acid, but less dilute than that present in the fully drowned mixture. It is well known that in the drowning operation the dilution of the waste acid associated with the centrifuged nitrocellulose must be rapidly effected in order to prevent the nitrogen content of the product being reduced appreciably and the product consequently being rendered useless or even decomposing violently.

The centrifuged cake of nitrocellulose moist with the undiluted waste acid is moreover very liable to fume off or fire with sufficient violence to injure the operator while he is dropping it into the drowning funnel. Such decompositions are especially violent and dangerous in the case of high nitrogen nitrocellulose such as guncotton. In the centrifuged cake of nitrocellulose conditions are favourable to the local development of high temperatures as a result of its being splashed with small quantities of water or other foreign material capable of diluting or chemically reacting with the waste acid associated with the nitrocellulose in the cake, and many of the dangerous decompositions that so frequently occur in practice may be attributed to splashes of water from the drowning funnel or other source finding their way into the centrifugal. Apart from dangerous manifestations, it is frequently found that in humid weather the nitrogen content of the nitrocellulose is sufficiently lowered to affect its solubility properties adversely, and this we attribute to the exposure of the cake of nitrocellulose to the atmosphere entailed while the operator is emptying the contents of the centrifugal basket into the drowning funnel.

It is an object of the present invention to provide an improved method and apparatus for the dilution of the waste acid associated with the centrifuged nitrocellulose cake, whereby the liability to the aforesaid hazards and disadvantages is reduced, and other advantages are attained.

According to the present invention, when the waste acid has ceased to drain from the annular cake of centrifuged nitrocellulose the liquid communication between the cake and the collected undiluted waste acid is cut, and thereafter the nitrocellulose is drowned while spinning by treating it with a stream of cold water, adequate to reduce its acidity to the desired value while effectively maintaining its nitrogen content, in the form of two or more equal curtains directed symmetrically with reference to the axis of rotation and distributed over the whole axial length of the annular cake of nitrocellulose; the stream of drowning water is interrupted; any residuum of the interrupted stream of drowning water in a position from which it can come into contact with a fresh charge in the centrifuge is displaced from said position with the aid of a medium indifferent to the undiluted waste acid; the said displaced water is removed from the centrifuge by spinning thereof; and thereafter communication with the collected undiluted waste acid is restored; the centrifuge being brought to rest at some stage in the sequence of operations after the stream of drowning water has been interrupted, the drowned charge then being removed from the centrifuge, and the centrifuge being thereafter recharged with nitrocellulose and waste acid or with cellulose and nitrating acid.

Since it is impracticable to interrupt the stream of drowning water at the locus where it is being distributed to the nitrocellulose, there will in practice be a residuum of the drowning water stream which must be removed so as to prevent it from finding its way into contact with the next batch of the mixture of nitrocellulose and waste acid or with the next nitration charge. The removal of this residuum may conveniently be effected by displacing it forwardly with compressed air, or with waste acid or the like liquid substantially without heating effect.

It will be understood that in carrying out the present invention it is necessary strictly to observe the sequence of the following operations, namely spinning away the undiluted waste acid, cutting communication between the centrifuge and the waste acid receptacle, applying the drowning water, displacing residual drowning water, removing said residual drowning water from the centrifuge, re-establishing communication between the centrifuge and the waste acid receptacle. Within the framework of this sequence, however, certain variations may be made as to the time at which the centrifuge is brought to rest and the charge removed and the centrifuge recharged. Thus, after the stream of drowning water has been interrupted, we may discontinue spinning and remove the cake of nitrocellulose before displacement of the residual water, in which case the centrifuge may be restarted in order to remove the displaced water before the connection to the waste acid is re-established and the new charge introduced. In this case we may use either compressed air or waste acid for displacing the residual drowning water. Preferably, the displacement of the residual drowning water may be carried out while the centrifuge is still spinning, although in this case it is necessary to use compressed air for the displacement, and in this alternative the residual drowning water after displacement is removed from the centrifuge through the cake of nitrocellulose, which is still in position, the centrifuge being thereafter brought to rest and the cake of nitrocellulose removed.

Variations may also be made in the time at which the centrifuge is recharged relative to the above-mentioned sequence of operations. Thus, spinning may be in progress before communication with the waste acid receptacle is re-established and a new charge introduced after such re-establishment of communication. Alternatively, communication may be re-established with the waste acid receptacle with the centrifuge at rest, and the new charge may be introduced either while the centrifuge is at rest or while the centrifuge is spinning, although desirably at a speed considerably below that employed during the drowning operation. Moreover, in the case where the nitration is conducted in the centrifuge the new charge of acid may be introduced in part while the centrifuge is stationary, but the remainder of the acid together with the cellulose should be added after spinning has been recommenced and while the centrifuge is rotating slowly.

It is not essential that each individual curtain of drowning water should present an unbroken front along the axial length of the nitrocellulose cake over which it is distributed, provided that the water curtains are arranged so that every part of the exposed area of the rotating nitrocellulose cake is impinged at least once in every rotation, and that the balance of the apparatus is maintained. Thus for instance there may be used curtains consisting of successively staggered rows of jets so that the water is sprayed more or less evenly over the area of the nitrocellulose irrespective of its rotation, but it is quite sufficient to use a single pair of diametrically oppositely directed curtains of water each unbroken over the whole axial length of the cake. It will be understood that while introducing the charge of the mixture of nitrocellulose and waste acid the rotation is desirably reduced to a speed considerably below that during the drowning operation or interrupted altogether.

The present invention also includes apparatus for the production of drowned nitrocellulose from the mixture obtained in the nitration of cellulose, comprising a centrifuge, means for introducing thereinto a charge of nitrocellulose and waste acid or a charge of cellulose and nitrating acid, one or more drowning water distributors each capable of directing a curtain of drowning water symmetrically with reference to the axis of rotation and distributed over the whole axial length of the filter element of the centrifuge, outlet control means comprising a two-way valve adapted to control the liquid communication between the centrifuge on the one hand, and either a spent drowning water sump or a waste acid receptacle on the other hand, means to control the supply of drowning water to the said distributors, and means to displace residual water from the distributors into the centrifuge when the supply of drowning water is cut off.

More particularly the apparatus according to the present invention comprises a drowning water valve, means to actuate a two-way valve to establish communication between the centrifugal and the spent drowning water sump and open the drowning water valve when such communication has been completely established, means to close the drowning water valve, and means operative on the closure of the drowning water valve first to displace the residual water and thereafter to actuate the two-way valve to establish communication between the centrifugal and the waste acid receptacle.

One suitable form of apparatus is illustrated for carrying out the process according to the invention in the accompanying drawings whereof Fig. 1 is a vertical section in a non-axial plane, and Fig. 2 is a plan view along the line ABCD in Fig. 1, both figures being of a portion of the apparatus showing the means whereby the curtains of drowning water are directed on to the nitrocellulose in the centrifugal: Figs. 3 and 4 are respectively a vertical section and a vertical side view showing the two-way valve by which the effluent from the centrifugal is diverted away from the drowning water sump towards the undiluted waste acid receptacle and vice versa and the manner in which the drowning water supply is controlled: and Fig. 5 is a vertical axial section of a modified form of the centrifuge portion of the apparatus in which the drowning of the nitrocellulose takes place.

In Fig. 1, 1, 2 and 3 represent respectively the open mouthed basket with perforated walls, the casing and the driving shaft of the centrifugal, 24 is the extension of the driving shaft to which the basket is attached and it is in the form of a spider, 4 is an annular bell cover provided with a handle 4a resting on an upstand 23 bounding openings in the base of the centrifugal basket near the driving shaft, through which the drowned nitrocellulose is dropped through an axial opening in the bottom of the centrifugal casing, the entrance to which is guarded by the flange 2a on the casing and the flange 12 on the basket. 5 is one of a number of ducts leading through pipe 11 into the centrifugal basket from a number of cellulose nitration apparatus, two of these ducts being shown at 5 and 5' in Fig. 2. 6 is the flanged outlet from the centrifugal casing 2 of which the base is slightly inclined towards it, 7 is a flanged pipe leading from the flanged outlet 6 to the two-way valve illustrated in Figs. 3 and 4. 8 is a lid on the centrifugal casing and 9 is a shaft guard, 10 is a hook on which the handle 4a of the bell cover 4 is hung while the centrifugal is being emptied of drowned nitrocellulose. 13 represents the floor of the building and 14 and 14a represent rising portions of a drowning water supply conduit leading from a main water valve 45 shown in Figs. 3 and 4. The angled upper portion 14a is flanged and bolted to another angled and descending portion 18 of the conduit leading directly through the centrifugal casing into the centrifugal basket and bolted to the centrifugal where the upper part of the portion 18 passes through an extension 15 of the centrifugal casing. The lower end of the portion 18 of the conduit is connected through a Y tube 19 to two distributing tubes 20, 20', one of which is shown broken off in Fig. 1, to which are attached the distributing slot jets 21 and 21', of which only one is shown in Fig 1. 17 is an air line, and 16 a non-return air valve controlling the supply of compressed air to an air injector 22 leading into the highest portion of the water supply conduit in the portion 14a.

In Figs. 3 and 4 the parts 6, 7, 13, 14 and 17 have the same significance as in Fig. 1. The parts comprising the two-way valve are the casing 25, the cover plate 26, the ported plug 27, the valve stopper ring 28 and the valve rod 32 screwed into the ported plug 27. 29 is a bent outlet pipe provided with a housing 29a to accommodate a stuffing box 33 for the valve rod 32. 30 is a connecting pipe leading from the bent outlet pipe 29 to a sump for the spent drowning water, not shown. 31 is a connecting pipe leading to a waste acid receptacle not shown. 34 is the gland of the stuffing box 33. 35, 35', 35" are supporting rods, 36 is a save-all, and 37 a drain leading from it; 38 is an operating bar attached to valve rod 32; 39 is a knuckle joint attaching the end of the valve rod 32 to the piston rod 58 passing through the gland 40 of a cylinder 42, supported by the plate 41. 43 is a self-closing by-pass piston valve housed on a supporting bracket 61, and 43a is its piston valve rod operated by upward movement of bar 38. 45 is a main self-closing drowning water supply valve and 46 the main drowning water supply pipe; 47, 47' are angled supports for air cylinder 53 and the water valve bracket 48 and are attached to the bracket 44 on the support 35. 49 is a piston valve and 49a its piston valve rod. 50 and 50a are arms attached to the piston rod 51 of the piston not shown in the cylinder 53 which operate rods 49a and 62 respectively. The piston rod 51 when it impinges a valve stem 59 opens the main water valve 45. In the supply air line 17 is valve 52 which is a self closing valve operated when the arm 50a impinges its valve stem 62. 54 is the piston of the cylinder 42, and 55, 55a are branches of an operating fluid line leading respectively to the cylinder 42 and the by-pass piston valve 43. 56 and 56a are branches of an operating fluid line respectively to the cylinder 53 and to the by-pass valve 49, from which latter the fluid line is continued as 56b into the top of the cylinder 42. Beyond the piston valve 43 the line 55a is continued as line 55b to the cylinder 53. 57 is a gland through which the piston rod 51 passes towards a drowning water valve stem 59; 60 is a bracket supporting the by-pass piston valve 49.

In Figs. 3 and 4 the apparatus is illustrated with the valve in position to permit the waste acid to enter the waste acid receptacle and prevent it from contaminating the spent drowning water in the sump.

In the operation of the valve operating gear the operating fluid is advantageously compressed air and the following description of its operation has reference to the use of that fluid. Compressed air is passed by the line 55 into the cylinder 42 whereby the piston 54 is driven upwards and the valve rod 32 attached by the knuckle joint 39 to the end of the piston rod 58 is caused to move the ported plug 27 upwards to the end of its stroke whereby the communication between the pipe 7 and the waste acid receptacle is cut off and a connection is opened between the pipe 7 and pipes 29 and 30. At the end of this upward stroke the operating bar 38 attached to the valve rod 32 strikes the piston valve rod 43a and thereby opens the bypass valve 43 and permits compressed air to pass from the line 55a to the line 55b and thence into the cylinder 53 at its outer end. The resulting motion of the piston rod 51 of that cylinder causes it to impinge the valve stem 59 and so open the self-closing drowning water valve 45. This allows water to pass from the inlet water pipe 46 to the portions 14, 14a and 18 of the drowing water supply conduit, and so through the Y tube and the distributing tubes 20 and 20' out of the slot jets 21 and 21' so as to drown the nitrocellulose in the rapidly spinning centrifugal basket. At this period of the operation the centrifuge is desirably rotating at full speed, and the water pressure should be sufficient to deliver something of the order of 10 to 20 times the weight of the nitrocellulose calculated on a dry basis in about one to two minutes. After the nitrocellulose has been thoroughly drowned, compressed air is allowed to pass by the line 56 into the inner end of the air cylinder 53 so as to drive back the piston rod 51, the air lines 55 and 55a being simultaneously passed to exhaust. The drowning water valve 45 closes automatically thus cutting off the drowning water supply to the centrifugal. The rigid arm 50a attached to the piston rod 51 impinges the stem 62 of the self-closing valve 52 before the piston rod comes to the end of its stroke. Compressed air is thereby allowed to pass from an external line not shown through the air line 17 and the non-return valve 16 and so through the air injector 22 so as to forcibly displace any residual water between the injector 22 and the slot jets 21 and 21' into the still spinning centrifugal basket, from which the equivalent quantity of spent drowning water passes into the pipes 6 and 7 and to the spent drowning water sump. As the piston rod 51 terminates its stroke, the rigid arm 50 attached to it impinges the piston valve rod 49a and so opens the piston valve 49 which admits compressed air from the line 56a into the line 56b and so to the top of the air cylinder 42, thus moving the valve rod 32 and ported plug 27 downwards to re-establish communication with the waste acid pipe 31, and cutting off communication with the spent drowning water pipes 29 and 30. The operator then stops the rotation of the centrifugal, releases the pressure in line 56, opens the lid 8 and the bell cover 4 and hangs it up by means of the handle 4a on the hook 10. He then discharges the annular cake of damp nitrocellulose through the openings bounded by the upstand 23, thereafter replacing the bell cover 4 and the lid 8. A fresh charge of nitrocellulose and waste acid is then admitted through one of the pipes 11 and ducts 5 into the centrifugal basket while the latter is at rest or running at a relatively slow speed. The rotation of the centrifugal basket is then brought to high speed and when the flow of waste acid through the pipe 31 has ceased the cycle of operations described above is recommenced. The operating fluid may be water instead of air.

The nature of the apparatus used in carrying out the present invention is governed to a certain extent by the nature of the cellulose employed. Thus, cotton linters or wood pulp cellulose may be nitrated either by the pot process or by the mechanical process, and the products of the nitration may be transferred to an overhead driven centrifuge of the kind above described. Cotton cops are liable, however, to yield a tangled nitration product and are customarily nitrated by the pot process, and a product of this nature could not conveniently be handled in an overhead driven centrifuge of the kind above described, and it is more suitable to employ an under driven centrifuge from which the drowned nitrocellulose may be removed by hand from above. Either form of cotton may be nitrated directly in a centrifuge, but in this case again it is preferred to use an under driven centrifuge, owing to the weight of the nitration charge. A suitable form of under driven centrifuge in which it is possible to carry out the whole process of nitration, separation of waste acid and the drowning is illustrated in Fig. 5. This modified form is applicable to the case in which the nitration of the cellulose, as well as the drowning of the nitrocellulose, takes place in the basket of a centrifuge. It can also be used when the nitration is carried out outside the centrifuge and is better adapted than that illustrated in Fig. 1 and Fig. 2 of the drawings for the drowning of forms of nitrocellulose that are difficult to pass through restricted apertures or passages, for instance nitrated cotton cops.

In Fig. 5 64 is the floor of a building, 65 is a supporting framework, 66 is a sloping base plate carried by the supporting framework, 70 is the outer vertical casing of the centrifuge. 67 is the shaft of the centrifuge, 68 is a pulley and 69 is a driving belt. 71 is the perforated, centrifugal basket wall, and 72 is the basket hub member mounted to rotate with the shaft 67. 73 is a retaining nut and 90 a removable housing. 74 is the shaft housing and 75 represents the two hinged halves of a cover that is shaped to cover in the whole of the circular area in the top of the casing 70 and also the housing 90, when they are closed, as shown by the broken lines. The solid lines indicate the opened position of the two halves of this cover. 76 is a retractable water spray distributing pipe that branches into two diametrically opposed nozzles 77 disposed within the basket clear of the basket hub member 72 and the housing 90. These nozzles have perforations arranged to permit the water to form curtains that are unbroken over the whole height of the rotating cake of nitrocellulose, shown at 78, where they impinge upon it at the diametrically opposite positions.

79 is a framework carrying a sleeve 80 through which the descending portion of the drowning water pipe 81 and the distributor 76 to which it leads can be caused, by means of a counterweighted cable 85, passing over a pulley not shown, to slide up and down to allow the distributing pipe and nozzles to be raised out of or lowered into the centrifuge. 82 and 83 are stops limiting the motion of the pipe 81. 84 is a flexible connection leading to the pipe 81 which may be arranged to be fed from the drowning water supply pipe 14 shown in Fig. 4 of the drawings. 91 is a flexible compressed air line forming a continuation of the pipe 17 shown in the said Fig. 4, 92 is a nonreturn air valve controlling the supply of compressed air to an air injector 93 leading into the highest portion of the drowning water pipe 81. The solid lines indicate the lower of the two limiting positions of the parts 76, 77, 81, 82, 84, 91, 92 and 93. The upper of the two limiting positions of the parts 76 and 77 is also indicated by broken lines.

86 is the common outlet for the waste acid and the spent drowning water and 87 is a cock leading to the flanged pipe 7, as shown in Figs. 3 and 4 of the drawings. 88 is an acid inlet pipe used and 89 a fume pipe.

When the nitration of the cellulose is to be carried out in the centrifuge, the cock 87 is turned so as to close off the outlet 86 from the pipe 7, and the pipe 81, is at the limit of its upward travel, thus holding the distributing tube and nozzles completely out of the centrifuge. A portion of the charge of nitrating acid, which is previously brought to a predetermined suitable temperature, is run into the centrifuge through the pipe 88, and the basket of the centrifuge is caused to rotate at a slow speed if it has not already been started up before or during this addition. The charge of cellulose is now introduced into the slowly rotating centrifuge basket while the remaining portion of the nitrating acid is run in. The hinged halves 75 of the cover are then closed down and the nitration reaction is allowed to proceed for the required length of time with the basket still rotating at slow speed. The cock 87 is then opened to permit the waste acid to enter the pipe 7, which, during all these operations, is in communication with the waste acid receptacle through a two-way valve 28, as shown in Fig. 3 of the drawings. The basket is now caused to rotate at full speed in order to spin away as much of the waste acid as can conveniently be removed, and as a result a cake of nitrocellulose is formed on the wall of the basket.

The centrifuge cover is next opened up and the nozzles 77 are lowered into the basket by allowing the pipe 81 to descend to the limit of its travel. The mechanism illustrated in Fig. 4 of the drawings is now actuated by the operator so as to perform the successive functions of establishing communications between the pipe 7 and the spent drowning water receptacle, and turning on the drowning water supply. The drowning water coming through the pipes 84 and 81 into the distributing pipe 76 is sprayed through the nozzles 77, thus drowning the rapidly rotating nitrocellulose.

The operator thereafter actuates the mechanism illustrated in Fig. 4 of the drawings so as to carry out the successive operations of shutting off the drowning water supply, displacing the residual drowning water and re-establishing communication with the waste acid receptacle. The drive of the centrifuge is also discontinued. The clearance of the residual drowning water is effected by the admission of a blast of compressed air through the compressed air pipe 17 shown in the aforesaid Figs. 3 and 4 and its continuation 91, the non-return valve 92 and the injector 93, into the pipe 81. The operator times it so that, although the drive has been discontinued, the centrifuge is still spinning when the residuum of drowning water associated with the lower part of the pipe 81, the distributing pipe 76 and nozzles 77 is expelled into the centrifuge, so that an equivalent amount of water is spun away from the nitrocellulose cake. The timing is also such that the re-establishment of the communication between the pipe 7 and the waste acid receptacle does not take place until this displaced water has substantially ceased to flow through the pipe 7.

The cable 85 is next manipulated to bring the pipe 81 to the upper limit of its travel and thus lift the distributing pipe 76 and nozzles 77 out of the centrifuge and when the basket has come to rest the cake of drowned nitrocellulose is unloaded by hand.

If the apparatus shown in Fig. 5 is not to be used for nitration of the cellulose, as well as the drowning, the cock 87 is left open permanently, and the said inlet pipe 88 is not used.

It is therefore obvious that the apparatus may be modified if desired by omitting the cock 87 and the inlet pipe 88; if desired the place of the latter may be taken by a chute or the like for facilitating the charging of the centrifuge with the mixture of nitrocellulose and waste acid.

The invention not only has the safety advantage that a fume-off or fire is less likely to occur than is the case by the hitherto used method of drowning the nitrocellulose charge after the waste acid has been centrifuged away from it, but also the advantage that the nitrocellulose which the operator unloads according to the present invention is already drowned, so that he does not require to be in close proximity to the nitrocellulose when it is most liable to decomposition, and when it is least pleasant to handle on account of the fumes. The drowning operation is therefore a more pleasant and less hazardous task for the operator.

It will be understood that other forms of apparatus than that particularly described may be used for the purposes of the invention.

We claim:

1. Apparatus for the production of drowned nitrocellulose by a repeated batch process comprising a centrifuge having at least one inlet for nitrocellulose and acid, drowning water distributors within said centrifuge, said distributors having means for displacing residual water therein, an outlet for said centrifuge, said outlet having a two-way valve connecting selectively with disposal means for said drowning water and receiving means for said waste acid, fluid operated means adapted for actuating said two-way valve for establishing communication between the centrifuge and the disposal means for said drowning water and thereafter for causing drowning water to flow to said distributors, and a delay action fluid operated cylinder adapted first to terminate the flow of drowning water from said distributors, then to actuate the residual water displacing means and thereafter to cause said two-way valve to establish communication between said centrifuge and said waste acid receiving means.

2. Apparatus for the production of drowned nitrocellulose by a repeated batch process as set forth in claim 1 wherein said drowning water distributors within said centrifuge are disposed symmetrically with reference to the axis of rotation of the same.

3. Apparatus for the production of drowned nitrocellulose by a repeated batch process comprising a centrifuge having at least one inlet for nitrocellulose and acid, drowning water distributors within said centrifuge, said distributors having means for displacing residual water therein, an outlet from said centrifuge provided with a two-way valve connecting selectively with disposal means for said drowning water and receiving means for said waste acid, fluid operated means for said valve adapted upon establishing communication between said centrifuge and said drowning water receiving means to actuate a delay action fluid operated cylinder and thereby cause water to flow through said distributors, said fluid operated cylinder being adapted upon sufficient drowning of said nitrocellulose to terminate the flow of drowning water, actuate said residual water displacing means, and thereafter cause said two-way valve to establish communication between said centrifuge and said waste acid receiving means.

4. Apparatus for the production of drowned nitrocellulose by a repeated batch process comprising a centrifuge having at least one inlet for nitrocellulose and acid, drowning water distributors within said centrifuge, said distributors having means for displacing residual water therein, an outlet from said centrifuge provided with a two-way valve connecting selectively with disposal means for said drowning water and receiving means for said waste acid, a fluid operated piston adapted for actuating said two-way valve, a first self-closing valve for supplying water to said distributors, a second self-closing valve for supplying air to said residual water displacing means, and a delay action fluid operated cylinder adapted upon the establishment of communication between said centrifuge and said drowning water receiving means to actuate said first self-closing valve and thereby drown said nitrocellulose and then to permit the closing of said first valve and actuate said second self-closing valve to cause removal of said residual water and then to actuate said fluid operated means for said two-way valve and thereby establish communication between said centrifuge and said waste acid receiving means.

5. Apparatus for the production of drowned nitrocellulose by a repeated batch process as set forth in claim 3 wherein said delay action fluid operated cylinder causes said two-way valve to establish communication between said centrifuge and said waste acid receiving means after drowning water has been removed from said nitrocellulose by said centrifuge in an amount equivalent to said residual water in said distributors.

JOHN DONALDSON PEARSON.
DONALD GEORGE ASHCROFT.

REFERENCES CITED

The following references are of record in the file of this patent:

UNITED STATES PATENTS

| Number | Name | Date |
|---|---|---|
| 1,146,445 | Phillips | July 13, 1915 |
| 1,212,831 | Spelman | Jan. 16, 1917 |
| 1,820,374 | Carlson | Aug. 25, 1931 |
| 2,223,663 | Roberts | Dec. 3, 1940 |
| 2,244,652 | Kochli | June 3, 1941 |
| 2,310,862 | Nessler | Feb. 9, 1943 |
| 2,328,256 | Breckenbridge | Aug. 31, 1943 |
| 2,434,476 | Wales | Jan. 13, 1948 |

FOREIGN PATENTS

| Number | Country | Date |
|---|---|---|
| 10,747 | Great Britain | of 1891 |